United States Patent [19]
Oda et al.

[11] Patent Number: 6,044,199
[45] Date of Patent: Mar. 28, 2000

[54] AUTHORING SYSTEM AND THE METHOD

[75] Inventors: Tsuyoshi Oda, Tokyo; Nobuyuki Takasu, Kanagawa; Masao Sasaki, Kanagawa; Toshiaki Setogawa, Kanagawa, all of Japan

[73] Assignee: Sony Corporation, Tokyo, Japan

[21] Appl. No.: 08/932,944

[22] Filed: Sep. 17, 1997

[30] Foreign Application Priority Data

Sep. 25, 1996 [JP] Japan ................................ 8-274094

[51] Int. Cl.[7] .................................................. H04N 5/91
[52] U.S. Cl. ............................................ 386/98; 348/423
[58] Field of Search .................................. 386/4, 45, 52, 386/55, 64, 95, 98, 125–126; 348/423, 473, 484, 7; H04N 5/91

[56] References Cited

U.S. PATENT DOCUMENTS

4,794,465  12/1988  Van Luyt et al. ...................... 358/441
5,568,275  10/1996  Norton et al. ............................ 386/52
5,671,226   9/1997  Murakami et al. ..................... 348/423
5,729,535   3/1998  Rostoker et al. ....................... 348/423
5,751,356   5/1998  Suzuki .................................... 348/423
5,966,495  10/1999  Takahashi et al. ....................... 386/95

*Primary Examiner*—Thai Tran
*Assistant Examiner*—Vincent F. Boccio
*Attorney, Agent, or Firm*—Frommer Lawrence & Haug, LLP.; William S. Frommer

[57] ABSTRACT

An authoring system according to the present invention is constituted so that when an audio signal and a video signal are encoded by an encoder and converted to one system of serial data, operation can be smoothly executed by simple constitution, compared with heretofore and the progress of processing in each device can be grasped. A condition set by a user is stored in a file and the file is shared among the encoder and others.

12 Claims, 8 Drawing Sheets

AUTHORING SYSTEM AND THE METHOD

BACKGROUND OF THE INVENTION

Field of the Invention

The present invention relates to an authoring tool which can be applied to an authoring system for converting an audio signal and a video signal to a system of serial data and recording it on an optical disc and others. The present invention enables simple constitution by storing conditions set by an operator in a file and sharing the file by encoding means and others, enables smooth editing and enables grasping the progress of processing in each device.

SUMMARY OF THE INVENTION

In the present invention, a necessary processing condition is stored in a file by vide signal processing means, audio signal processing means and multiplexing means and shared in the video signal processing means, the audio signal processing means and the multiplexing means.

If a processing condition is stored in a file and shared in the video signal processing means, the audio signal processing means and the multiplexing means, a series of processing can be executed only by setting the file and instructing the video signal processing means, the audio signal processing means and the multiplexing means to start operation in order. The condition of processing by the multiplexing means in a late step can be also obtained using the file, hereby the contents of the file can be verified and the progress of processing can be grasped.

DESCRIPTION OF THE PREFERRED EMBODIMENT

Referring to the drawings suitably, an embodiment of the present invention will be described in detail below.

In an authoring system, after an audio signal and a video signal are respectively encoded, a multiplex stream which can be recorded on an optical disc is generated by multiplexing.

Figure 8:
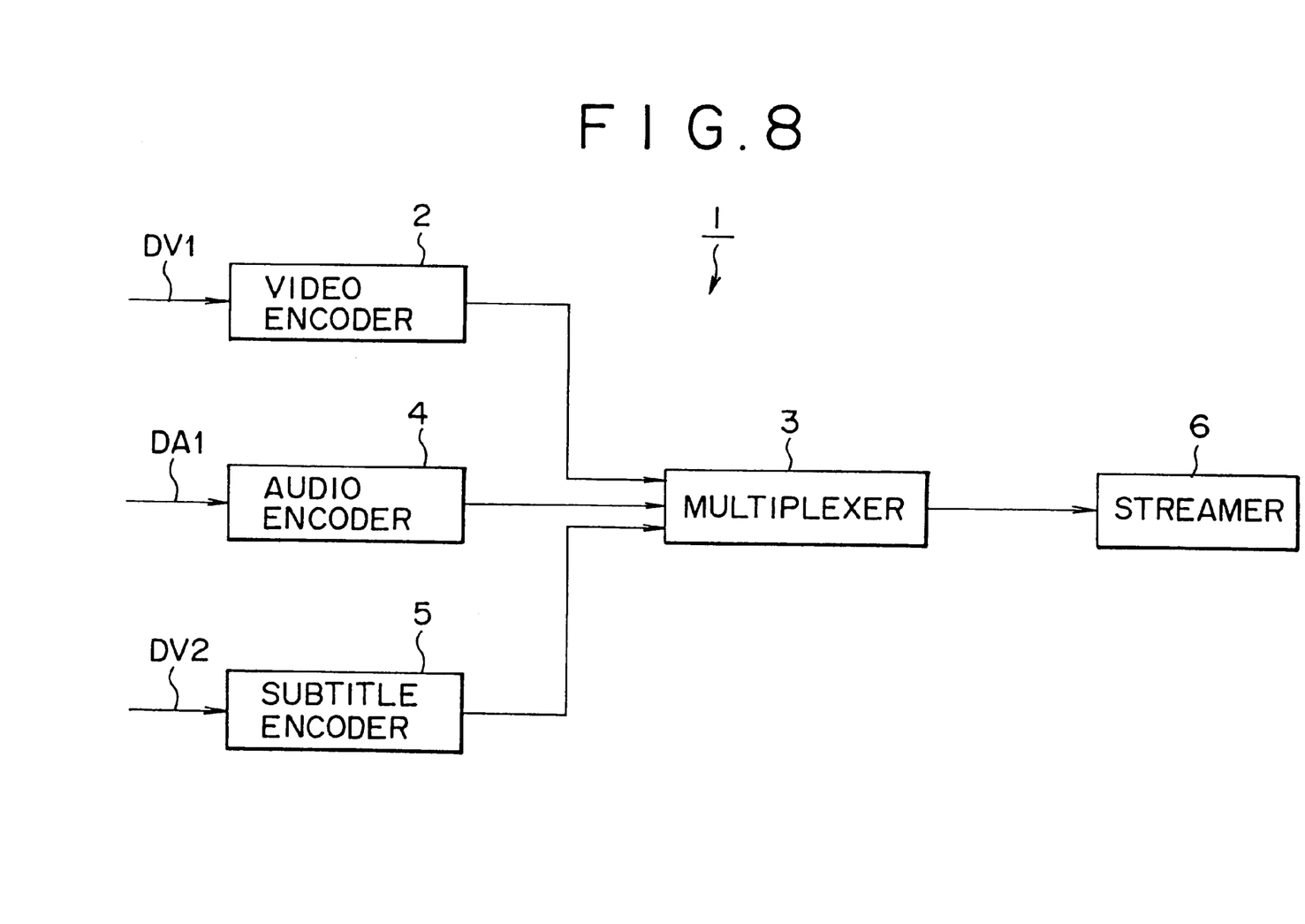
FIG. 8 is a block diagram showing the authoring system.

That is, FIG. 8 is a block diagram showing the authoring system. In the authoring system 1, a video encoder 2 receives the setting of various conditions required for encoding such as an edited matter and a processing mode by the operation of an operator and encodes a digital video signal DV1 input from a digital video tape recorder and others in units of predetermined block according to these conditions. At this time, the video encoder 2 detects the data quantity of data rows (hereinafter called an elementary stream) which is the result of encoding in units of frame of a digital video signal DV1 and supplies the detected data quantity together with an elementary stream to a multiplexer 3.

Similarly, an audio encoder 4 receives the setting of various conditions required for encoding from an operator, encodes a digital audio signal DA1 input from a digital audio tape recorder and others in units of predetermined block according to these condition and generates an elementary stream based upon an audio signal. At this time, the audio encoder 4 detects the data quantity of the elementary stream every audio frame of a digital audio signal DA1 and supplies the detected data quantity together with the elementary stream to the multiplexer 3.

A subtitle encoder 5 receives the setting of various conditions required for encoding from an operator and encodes a digital video signal DV2 such as a title according to these conditions as the video encoder 2. Further, the subtitle encoder 5 supplies an elementary stream based upon the digital video signal DV2 together with the data quantity to the multiplexer 3.

The multiplexer 3 multiplexes an elementary stream respectively sent from the video encoder 2, the audio encoder 4 and the subtitle encoder 5 and outputs a system of data rows (hereinafter called a multiplex stream). At this time, the multiplexer 3 receives conditions required for multiplexing set by an operator such as a recorded order of each digital signal and allowable data arrangement on an optical disc and multiplexes according to these conditions and based upon the data quantity of an elementary stream.

A streamer 6 records a multiplex stream output from the multiplexer 3 on a magnetic tape and supplies it to a master unit.

Hereby, in this type authoring system, a condition required for processing in each device is set, data such data quantity is supplied to a device in a late step and a series of processing is executed.

In such an authoring system, if a processing condition set by each device can be set via one terminal equipment, this type authoring operation can be smoothly executed and the facility of the authoring system can be more enhanced. Also, if the progress of processing in each device can be grasped via the terminal equipment, it is convenient.

In this case, various conditions can be collectively set via a computer by collectively controlling the operation of the whole system by the one computer and the progress of processing in each device can be grasped.

However, if so, there is a problem that a control program for controlling the whole operation is complicated. If a control program is complicated as described above, operation such as debugging is also complicated.

The present invention is made in view of the above problem and the object is to provide an authoring system which is provided with simple constitution, enables the smooth execution of editing and enables grasping the progress of processing in each device easily.

Figure 1:
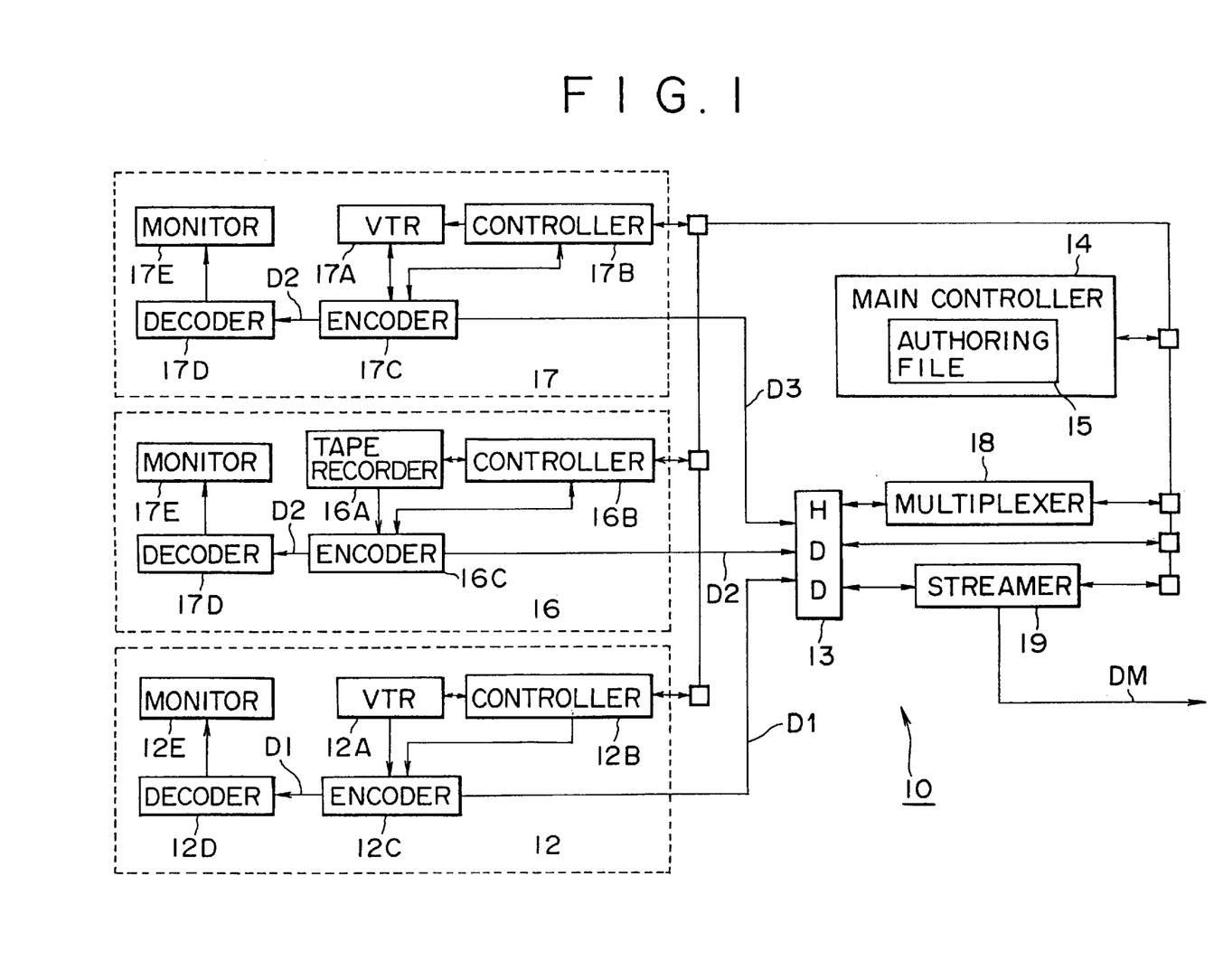
FIG. 1 is a block diagram showing an authoring system equivalent to an embodiment of the present invention.

FIG. 1 is a block diagram showing an authoring system equivalent to an embodiment of the present invention. The authoring system 10 is constituted by connecting each device via a network and generates a multiplex stream recorded on an optical disc.

That is, in the authoring system 10, a subtitle signal processor 12 encodes a digital video signal such as a subtitle supplied by a video tape recorder (VTR) 12A and outputs it.

That is, in the subtitle signal processor 12, the video tape recorder 12A reproduces a magnetic tape and outputs a digital video signal to an encoder 12C. At this time, the video tape recorder 12A is controlled by a controller 12B and selectively reproduces a magnetic tape according to a list based upon a time code preset by an operator.

The encoder 12C is similarly operated under control by the controller 12B, encodes a digital video signal output from the video tape recorder 12A according to run-length encoding and outputs an elementary stream D1. At this time, the encoder 12C generates one delimited elementary stream D1 every digital video signal selectively output from the video tape recorder 12A and stores each generated elementary stream D1 in a hard disk (HDD) 13 as one file via a small computer system interface (SCSI).

A decoder 12D receives an elementary stream D1 output from the encoder 12C, decodes it so that it is the original digital video signal and outputs it. A monitor 12E displays the digital video signal and hereby, the result of encoding can be immediately checked on the side of a terminal via the subtitle signal processor 12.

The controller 12B is constituted by a computer for controlling the operation of the subtitle signal processor 12 and when the start of processing is instructed via communication by way of a socket between the controller and the main controller 14, the controller opens and accesses to an authoring file 15 stored in the main controller 14. The controller 12B controls the operation of the video tape recorder 12A and the encoder 12C according to the contents of the authoring file 15, executes a series of encoding set by an operator and when the controller completes the processing, it notifies the main controller 14 of the completion of the processing via communication by way of a socket.

The controller 12B specifies the number and the type such as language of digital video signals to be processed, time information such as a time code, an address in which encoded data is stored in a hard disk 13 and others based upon the authoring file 15 in relation to the processing and controls the video tape recorder 12A and the encoder 12C according to the specified contents. In the meantime, a detailed condition such as the color of a subtitle related to only the encoding of a digital video signal is input via the keyboard of the controller 12B and the controller controls the video tape recorder 12A and the encoder 12C according to the condition.

Therefore, the subtitle signal processor 12 is constituted so that a detailed encoding condition can be set on the side of the subtitle signal processor 12 and hereby, facility can be enhanced. The subtitle signal processor is also constituted so that the condition of encoding related to the whole authoring processing except these conditions can be set after the authoring file 15 is updated.

Further, the encoder 12C notifies the main controller 14 of the data quantity of an elementary stream D1 in units of frame including digital video signals and the data quantity is recorded in the authoring file 15. The encoder also records the physical address and others of an elementary stream D1 in the hard disk 13 in the authoring file 15.

Hereby, the subtitle signal processor 12 records various conditions required for processing in a late step in the authoring file 15.

An audio signal processor 16 encodes and outputs an audio signal supplied from a tape recorder 16A. That is, the tape recorder 16A reproduces a magnetic tape and outputs a digital audio signal to an encoder 16C. At this time, the tape recorder 16A selectively reproduces the magnetic tape under control by a controller 16B according to a list consisting of time codes preset by an operator.

The encoder 16C is similarly operated under control by the controller 16B, encodes a digital audio signal output from the tape recorder 16A according to a predetermined format and outputs an elementary stream D2. At this time, the encoder 16C generates an elementary stream D2 every digital audio signal selectively output from the tape recorder 16A and stores each generated elementary stream D2 in the hard disk 13 via SCSI.

A decoder 16D receives an elementary stream D2 output from the encoder 16C, decodes it so that it is the original digital audio signal and outputs it. A monitor 16E consists of a speaker, monitors the digital audio signal and hereby, the result of encoding can be immediately checked on the side of a terminal via an audio signal processor 16.

The controller 16B is constituted by a computer for controlling the operation of the audio signal processor 16 and when the instruction of the start of processing is input via communication by way of a socket between the controller and the main controller 14, the controller opens and accesses to the authoring file 15 stored in the main controller 14. The controller 16B controls the operation of the tape recorder 16A and the encoder 16C according to the contents of the authoring file 15 and executes a series of encoding set by an operator. Further, when the processing is completed, the controller 16B notifies the main controller 14 of the completion of the processing via communication by way of a socket.

The controller 16B specifies capacity allowed to an audio signal, the number and the type such as language of digital audio signals to be processed which are multiplexed to one authoring, that is, one signal, a time code, the mode of encoding (AC-3/MPEG2/linear PCM), an address in which an encoded audio signal is to be recorded in the hard disk 13 and others based upon the authoring file 15 in relation to the above processing, and controls the tape recorder 16A and the encoder 16C according to the specified contents. In the meantime, a quantization table and others required for encoding are input via the keyboard of the controller 16B and the controller controls the tape recorder 16A and the encoder 16C according to this condition.

Therefore, the audio signal processor 16 is constituted so that a detailed encoding condition can be set on the side of the audio signal processor 16 and hereby, facility can be enhanced. The audio signal processor is also constituted so that the condition of encoding related to the whole authoring processing except these conditions can be set after the authoring file 15 is updated.

Further, the encoder 16C notifies the main controller 14 of the data quantity of an elementary stream D2 in units of audio frame and the data quantity is recorded in the authoring file 15. The encoder also records the physical address of an elementary stream D2 in the hard disk 13 in the authoring file 15.

Hereby, the audio signal processor 16 records various conditions required for processing in a late step in the authoring file 15.

A video signal processor 17 encodes and outputs a digital video signal supplied from a video tape recorder (VTR) 17A. In the video signal processor 17, the video tape recorder 17A reproduces a magnetic tape and outputs a digital video signal to an encoder 17C. At this time, the video tape recorder 17A selectively reproduces the magnetic tape under control by a controller 17B according to a list consisting of time codes preset by an operator.

The encoder 17C is similarly operated under control by the controller 17B, encodes a digital video signal output from the video tape recorder 17A according to a format defined in a moving picture experts group 2 (MPEG2) and outputs an elementary stream D3. At this time, the encoder 17C generates an elementary stream D1 every a series of digital video signals selectively output from the video tape recorder 17A and stores each generated elementary stream D3 in the hard disk 13 via SCSI.

A decoder 17D receives the elementary stream D3 output from the encoder 17C, decodes it so that it is the original digital video signal and outputs it. A monitor 17E displays the digital video signal and hereby, the result of encoding can be immediately checked on the side of a terminal via the video signal processor 17.

The controller 17B is constituted by a computer for controlling the operation of the video signal processor 17 and when the instruction of the start of processing is input via communication by way of a socket between the controller and the main controller 14, the controller accesses to the authoring file 15 stored in the main controller 14. The controller 17B controls the operation of the video tape recorder 17A and the encoder 17C according to the contents of the authoring file 15 and executes a series of encoding set by an operator. Further, when the processing is completed, the controller 17B notifies the main controller 14 of the completion of the processing via communication by way of a socket.

The controller 17B specifies capacity allowed to video, the type such as NTSC/PAL of a digital video signal to be processed, a time code, the mode of encoding, an address for encoded video data to be stored in the hard disk 13 based upon the authoring file 15 in relation to the processing and others and controls the video tape recorder 17A and the encoder 17C according to the specified contents. In the meantime, a quantization table required in encoding, the number of pictures constituting GOP, the setting of the frequency of I picture and P picture and others are input via the keyboard of the controller 17B and the controller controls the video tape recorder 17A and the encoder 17C according to these conditions.

Hereby, the video signal processor 17 is constituted so that a detailed condition can be set on the side of the video signal processor 17, hereby, the detailed condition can be changed on the side of the video signal processor after a decoded video signal is monitored and facility can be enhanced. The video signal processor is also constituted so that the condition of encoding related to the whole authoring processing except these conditions can be set after the authoring file 15 is updated.

Further, the encoder 17C notifies the main controller 14 of the data quantity of the elementary stream D3 in units of frame consisting of digital video signals and the data quantity is recorded in the authoring file 15. The encoder also records a physical address in which the elementary stream D3 is actually stored in the hard disk 13 in the authoring file 15.

Hereby, the video signal processor 17 records various conditions required in a late step in the authoring file 15.

A multiplexer 18 generates a multiplexing list for generating a multiplex stream based upon the elementary streams D1, D2 and D3 stored in the hard disk 13.

That is, the multiplexer 18 is constituted by an interface which accesses to the hard disk 13 via SCSI and a computer for controlling the interface and when the instruction of the start of processing is input via communication by way of a socket between the multiplexer and the main controller 14, the multiplexer accesses to the authoring file 15 stored in the main controller 14.

At this time, the multiplexer 18 generates the multiplexing list consisting of the start address in the hard disk 13 of each elementary stream and the size of a block into which each elementary stream D1, D2 and D3 is to be divided based upon the data quantity of each elementary stream D1, D2 and D3 recorded in the authoring file 15 and the data quantity of each elementary stream D1, D2 and D3 which can be sequentially recorded on an optical disc.

Further, the multiplexer 18 records the multiplexing list in the authoring file 15. In this embodiment, a series of data rows read from the hard disk 13 according to the multiplexing list are a multiplex stream. Some multiplexing lists are stored not in the authoring file 15 but in memory in the multiplexer 18.

The multiplexer 18 reads the elementary streams D1, D2 and D3 in order from the hard disk 13 according to the multiplexing list recorded in the authoring file 15 and outputs a multiplex stream DM. At this time, the multiplexer 18 adds disk information such as a disk number and attribute information such as the identification information of each elementary stream according to the contents recorded in the authoring file 15 and generates the multiplex stream. Further, the multiplexer 18 records a time code, a file name, total data quantity when processing is completed in the authoring file 15 every time a fixed quantity of processing is completed. The generated multiplex stream is recorded in the hard disk 13.

A streamer 19 is constituted by an interface which accesses to the hard disk 13 via SCSI and a computer for controlling the interface and when the instruction of the start of processing is input via communication by way of a socket between the streamer and the main controller 14, the streamer accesses to the authoring file 15 stored in the main controller 14. When the streamer 19 receives the instruction of recording from the main controller 14, the streamer reads the multiplex stream from the hard disk 13 and writes it on a recording medium such as a tape.

The hard disk 13 is provided with plural SCSI ports, stores and outputs the elementary streams D1, D2 and D3 and when the output of the elementary streams D1, D2 and D3 to the streamer 19 is completed, the hard disk releases a storage area in which the output is completed according to an instruction from the main controller 14.

Figure 2:
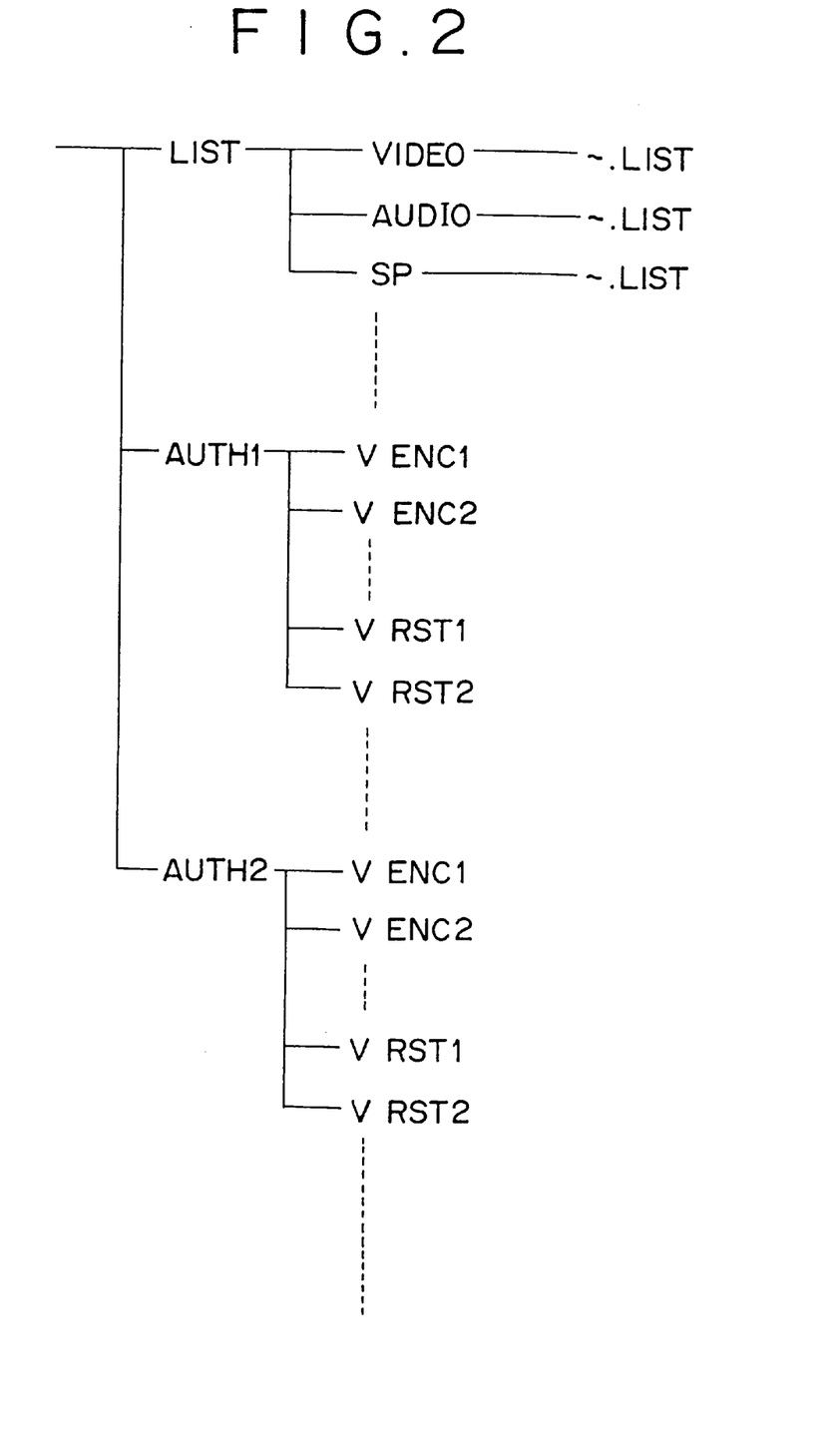
FIG. 2 is a chart showing the directory structure of an authoring file.

The authoring file 15 is constituted by plural files according to directory structure shown in FIG. 2 in the hard disk built in the main controller 14. The authoring file 15 is stored so that the subtitle signal processor 12, the audio signal processor 16, the video signal processor 17, the multiplexer 18 and the streamer 19 can freely access to the authoring file 15 and can update the contents and hereby, is shared by the subtitle signal processor 12 and others.

For the authoring file 15, directories of video, audio and a subtitle, "VIDEO", "AUDIO" and "SP" are formed under a directory of a list, "LIST" and a file of each list, "~. LIST", is arranged under these directories of video, audio and a subtitle, "VIDEO", "AUDIO" and "SP".

In a file of each list "~. LIST", the condition of processing and the name of a file in which the result of processing is described of video, audio or a subtitle are described in a text format according to the directory structure of the authoring file. In the concrete, if two types of authoring processing is sequentially executed in the authoring system 10, the names of files describing the condition of processing about the processing of a digital video signal in first authoring processing, ". . . /AUTH1/V ENC1", ". . . /AUTH1/V ENC2" and the following are sequentially described in a file in a video list "~. LIST", and similarly, the names of files describing the result of processing, ". . . /AUTH1/V RST1", ". . . /AUTH1/V RST2" and the following are sequentially described. Further, the names of files describing the condition of processing about the processing of a digital video signal in second authoring processing, " . . . /AUTH2/V ENC1", " . . . /AUTH2/V ENC2" and the following are sequentially described and similarly, the names of files describing the result of processing, ". . . /AUTH2/V RST1", " . . . AUTH2/V RST2" and the following are sequentially described.

In the meantime, directories corresponding to the first and second authoring processing, "AUTH1" and "AUTH2" are formed in parallel with the directory of a list "LIST". Further, concrete files respectively describing the condition of processing and the result of processing about video, audio or a subtitle, "V ENC1" and "V RST1", "V ENC2" and "V RST2" and the following are arranged under each directory, "AUTH1" and "AUTH2". For audio and a title, similarly, concrete files respectively describing the condition of processing and the result of processing are arranged under each directory, "AUTH1" and "AUTH2".

In the files describing the condition of processing, "V ENC1", "V ENC2" and the following, various conditions required for encoding such as the roll number of a magnetic tape on which the target of processing is recorded, a list showing a digital video signal to be encoded based upon a time code and the mode of encoding are recorded. Also, in the files describing the condition of processing, "V ENC1", "IV ENC2" and the following, the data quantity of each elementary stream D1, D2 and D3 which can be sequentially recorded on an optical disc and is required for generating a multiplex stream and others are recorded and attribute information required for the streamer 19 and others are also recorded.

The authoring file 15 is constituted so that hereby, when the subtitle signal processor 12, the audio signal processor 16 and the video signal processor 17 respectively detect a file "~. LIST" of each list of processing via the directory "LIST" of the corresponding list and respectively access to the files described in the file "~. LIST" of the list, " . . . /AUTH1/V ENC1", " . . . /AUTH1/V ENC2" and the following, the subtitle signal processor 12, the audio signal processor 16 and the video signal processor 17 can respectively obtain a condition required for encoding.

In the meantime, in the files describing the result of processing, " . . . /AUTH1/V RST1", " . . . /AUTH1/V RST2" and the following, the data quantity of each elementary stream D1, D2 and D3 which is the result of encoding and others are described based upon a time code. The authoring file 15 is constituted so that hereby, when the multiplexer 18 accesses to files respectively including the condition of processing and the result of processing, it can obtain a condition required for multiplexing.

Also, in the files describing the result of processing, " . . . /AUTH1/V RST4" and the following, a multiplexing list including the result of multiplexing is recorded. The authoring file 15 is constituted so that hereby, when the multiplexer 18 accesses to files respectively including the condition of processing and the result of processing, it can obtain a condition required for generating a multiplex stream. Further, in these files, " . . . /AUTH1/V RST5" and the following, a time code, a file name, total data quantity and others respectively output from the multiplexer 18 are recorded.

The authoring file 15 is generated by the main controller 14 when an operator inputs the condition of authoring processing beforehand via the keyboard of the main controller 14. When each device starts processing according to an instruction from the main controller 14, the contents of the authoring file 15 are updated by each device according to the progress of processing. Hereby, in the authoring system 10, a condition required for authoring processing can be set via the main controller 14 except a processing condition which can be set only by each device. The progress of processing can be also grasped by monitoring the contents of the authoring file 15 via the main controller 14 if necessary. Further, processing can be executed only by sharing the authoring file 15 and notifying each terminal of the start and the completion of processing via communication by way of a socket and the unified control of these can be readily realized.

Figure 3:
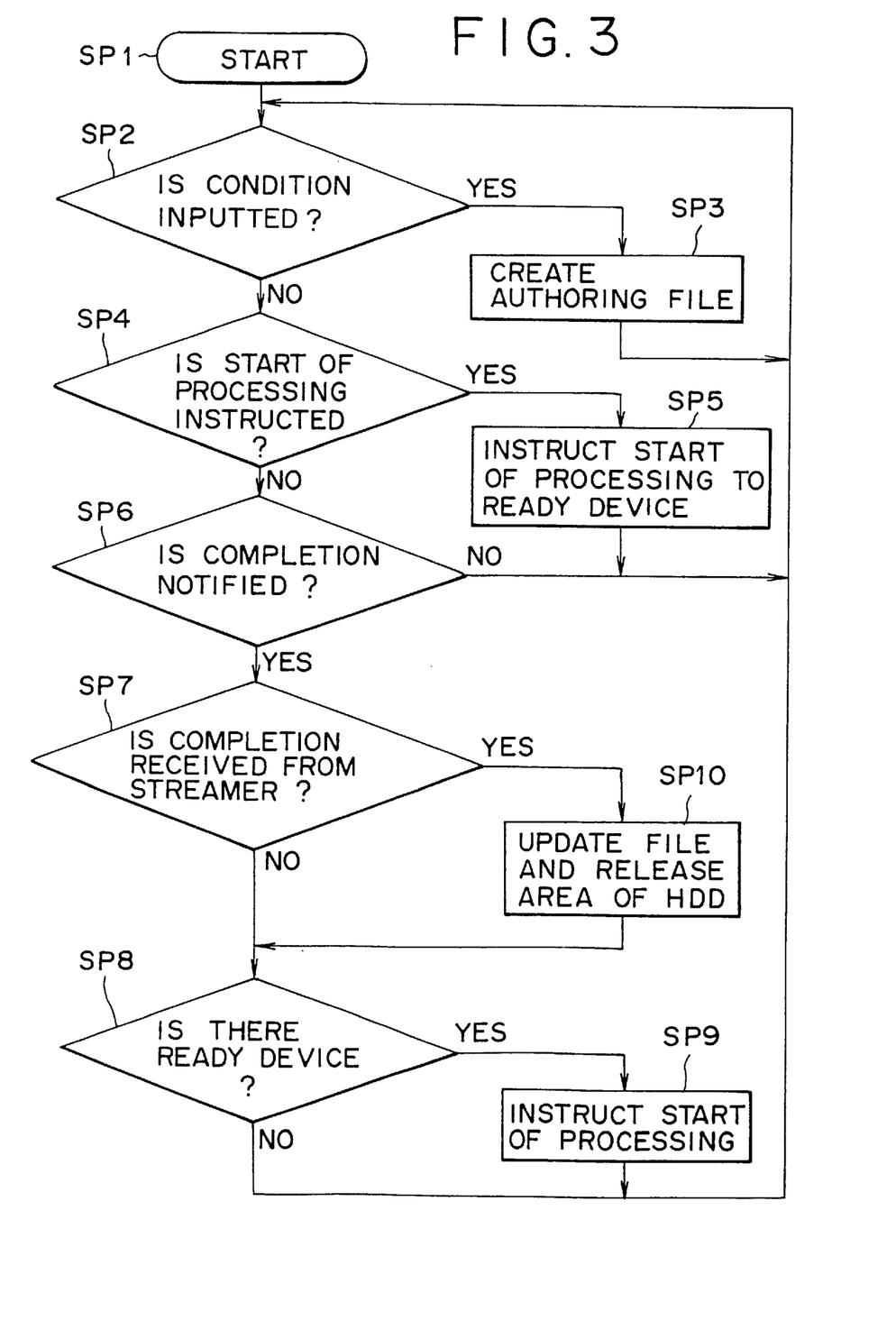
FIG. 3 is a flowchart showing a processing procedure by a main controller 14.

That is, the main controller 14 is constituted by a microcomputer for controlling the operation of the whole authoring system 10, executes a processing procedure shown in FIG. 3, generates the authoring file 15 and instructs the subtitle signal processor 12, the audio signal processor 16, the video signal processor 17, the multiplexer 18 and the streamer 19 to start operation.

That is, when the main controller 14 is activated, processing proceeds from a step SP1 to a step SP2, the main controller judges whether an operator selects the input of a processing condition or not and if an affirmative result is obtained, processing proceeds to a step SP3. In the step, the main controller 14 accepts the condition of authoring processing in dialog and after the main controller generates the authoring file 15 according to the above directory structure shown in FIG. 2 according to the accepted condition, processing is returned to the step SP2.

In the meantime, when a negative result is obtained in the step SP2, processing proceeds to a step SP4 and the main controller judges whether the operator instructs the start of processing or not. If an affirmative result is obtained in the step, processing proceeds to a step SP5 and the main controller 14 instructs a ready processor to start processing. If no authoring processing is started, the subtitle signal processor 12, the audio signal processor 16 and the video signal processor 17 can start encoding, the multiplexer 18 can start processing after the processing of these processors 12, 16 and 17 is completed and the streamer 19 can start processing after the processing of the multiplexer 18 is completed. Hereby, in this case, after the main controller 14 instructs the subtitle signal processor 12, the audio signal processor 16 and the video signal processor 17 to start processing, processing is returned to the step SP2.

In the meantime, if a negative result is obtained in the step SP4, processing proceeds to a step SP6 and the main controller judges in the step whether the completion of processing is notified from any processor or not. If a negative result is obtained, processing is returned to the step SP2, while if an affirmative result is obtained, processing proceeds to a step SP7.

In the step, the main controller 14 judges whether the streamer 19 notifies the completion of processing or not and if a negative result is obtained, processing proceeds to a step SP8. In the step, the main controller 14 judges based upon the notification of the completion of the processing whether a processor is newly ready or not. If the notification of the completion of the processing is obtained from one of the subtitle signal processor 12, the audio signal processor 16 and the video signal processor 17 in case one authoring processing is registered in the authoring file 15 for example, the multiplexer 18 and the streamer 19 cannot start the next processing and for the processors in which processing is completed, no next object of processing exists. In such a case, as in the step SP8 a negative result is obtained, processing is returned to the step SP2.

In the meantime, if another authoring processing is registered in the authoring file 15 in case the notification of the completion of the processing is obtained from one of the subtitle signal processor 12, the audio signal processor 16 and the video signal processor 17, the processor in which the processing is completed can start the next authoring processing. If the completion of processing is notified from all of the subtitle signal processor 12, the audio signal processor 16 and the video signal processor 17, the next multiplexer 18 can start multiplexing. In this case, as an affirmative result is obtained in the step SP8, processing proceeds to a step SP9 and after the main controller 14 instructs a ready processor to start processing, processing is returned to the step SP2.

Hereby, when encoding is completed in the subtitle signal processor 12, the audio signal processor 16 and the video signal processor 17, the main controller 14 instructs the multiplexer 18 to start processing and when the processing is completed in the multiplexer 18, the main controller instructs the next streamer 19 to start processing. Further, if plural authoring processing is registered in the authoring file 15, the main controller instructs the processor in which processing is completed to start the next authoring processing.

As described above, when the streamer 19 completes processing after the main controller instructs the streamer 19 to start processing, an affirmative result is obtained in the step SP7. In this case, processing proceeds to a step SP10, the main controller updates the authoring file 15 and removes a file the processing of which is completed from the object of processing. Further, the main controller outputs a control command to the hard disk 13, deletes the elementary streams D1, D2 and D3 the processing of which is completed and releases areas in which these elementary streams D1, D2 and D3 are respectively stored. Hereby, the main controller 14 can control the authoring system 10 by simple processing uniformly and can execute authoring processing smoothly.

Further, the main controller 14 opens a file including the result of processing in the authoring file 15 according to the operation of an operator and displays the contents recorded in the file. Hereby, the main controller 14 can grasp the progress of processing.

Figure 4:
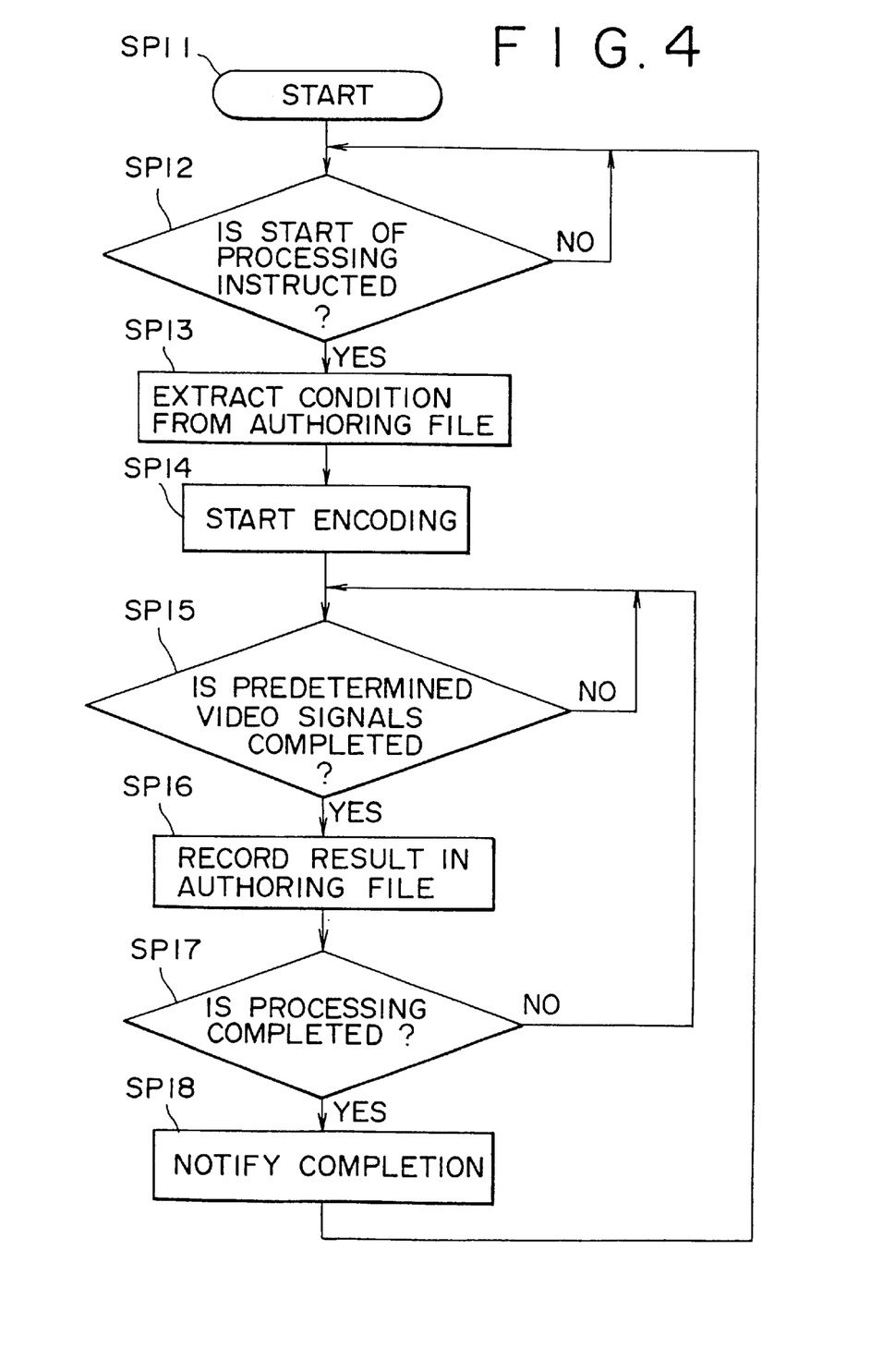
FIG. 4 is a flowchart showing a processing procedure by a controller in a subtitle signal processor and a video signal processor.

FIG. 4 is a flowchart showing a processing procedure by the controllers 12B and 17B corresponding to the control by the main controller 14 in the subtitle signal processor 12 and the video signal processor 17. However, in this embodiment, as the controllers 12B and 17B execute approximately the same processing except that they are different in the contents of a digital video signal which is the object of processing and the object of control, a processing procedure by the controller 17B of the video signal processor 17 will be described below and the description of the controller 12B will be omitted.

That is, when the authoring system 10 activates the controller 17B, processing proceeds from a step SP11 to a step SP12 and the controller judges whether the instruction of the start of processing is input from the main controller 14 or not. If a negative result is obtained, the controller 17B repeats the processing in the step SP12 and if the instruction of the start of processing is input, processing proceeds to a step SP13.

In the step, the controller 17B opens the authoring file 15 and obtains the condition of processing. Next, processing proceeds to a step SP14, the controller 17B requests an operator to insert a tape cartridge if necessary according to the obtained condition and when the corresponding tape cartridge is inserted, the controller starts the reproduction of a magnetic tape according to a list based upon a time code. Further, the controller 17B instructs the encoder 17C to start the encoding of a regenerative signal according to a condition recorded in the authoring file 15.

Next, processing proceeds to a step SP15, the controller 17B judges whether the encoding from a time code to a time code respectively defined in the authoring file is completed or not and if a negative result is obtained, the controller repeats the processing in the step SP15. In the meantime, if the encoding from a predetermined time code to a predetermined time code is completed and an affirmative result is obtained, processing proceeds to a step SP16. In the step, the controller 17B records the data quantity of the elementary stream D3 for the time codes in the authoring file 15 in units of frame including digital video signals.

Next, processing proceeds to a step SP17, in the step the controller 17B judges whether encoding required for one authoring processing recorded in the authoring file 15 is completed or not and if a negative result is obtained, processing is returned to the step SP15.

In the meantime, as an affirmative result is obtained in the step SP17 if encoding required to one authoring processing is completed, processing proceeds to a step SP18 and after the controller notifies the main controller 14 of the completion of the processing, processing is returned to the step SP12 and the controller is ready for the next instruction.

Hereby, if the next authoring processing is registered in the authoring file 15, the controller 17B executes encoding in the next authoring processing according to an instruction from the main controller 14, hereby effectively avoids the occurrence of idle time and the video signal processor 17 and the subtitle signal processor 12 sequentially encode a digital video signal.

As described above, the video signal processor 17 and the subtitle signal processor 12 execute encoding according to the contents of the authoring file 15 registered by the main controller 14 by simple control only including communication between either of them and the main controller 14 for notifying the start and the completion of processing and record information required for next multiplexing in the authoring file 15.

When an operator operates while the series of processing is executed, the controller 17B stops encoding, releases a quantization table used for the encoding and accepts the change of the number of pictures of GOP. Further, the controller 17B starts encoding according to the changed condition retroactively in a list based upon a time code by the instruction of the operator and updates the contents of the hard disk 13 by the elementary stream D3 obtained by the encoding.

As described above, the video signal processor 17 and the subtitle signal processor 12 are constituted so that the condition of encoding except a condition required to be set on the side of each device can be set by the main controller 14, the progress of processing can be monitored by the main controller 14 and therefore, they can be uniformly controlled by the main controller 14.

Figure 5:
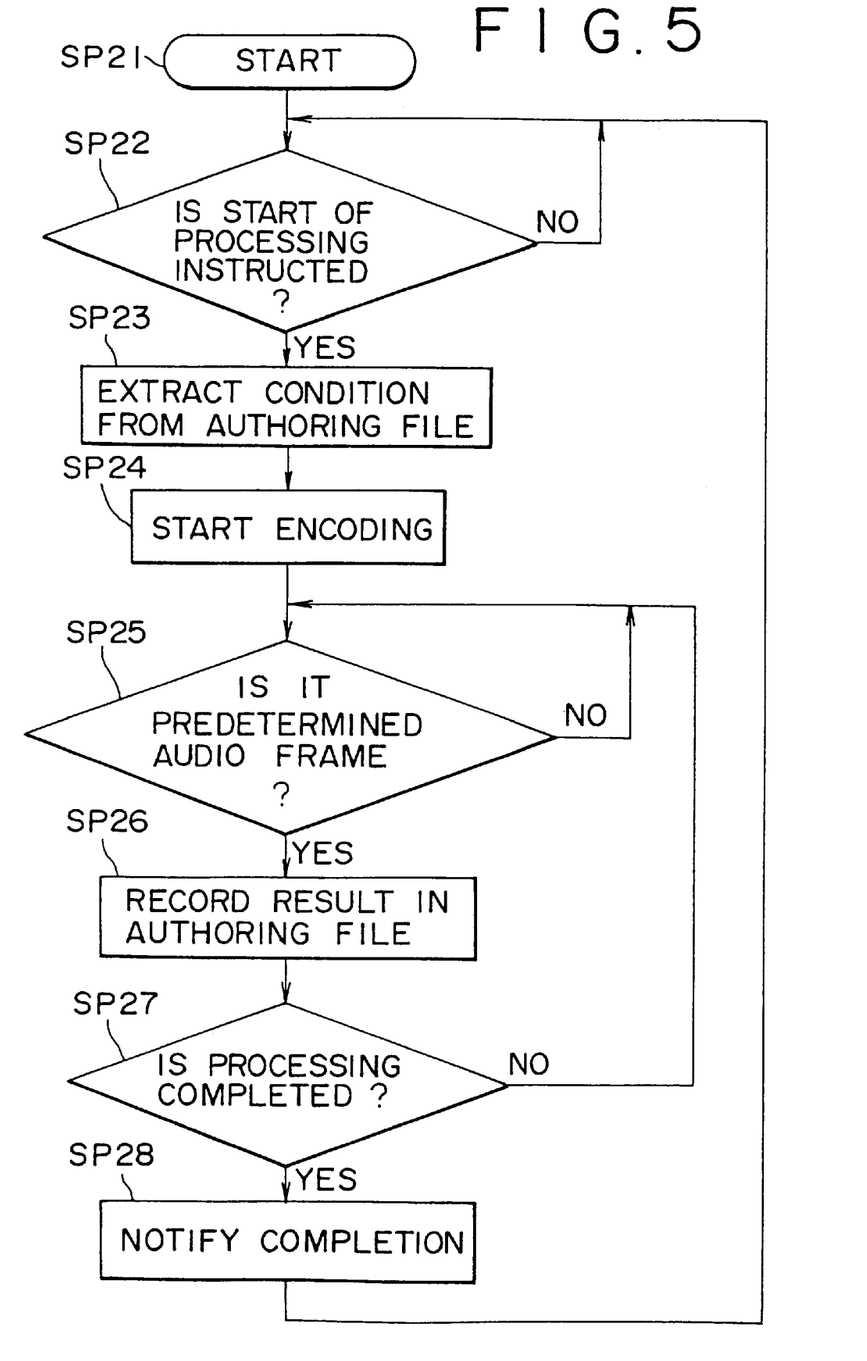
FIG. 5 is a flowchart showing a processing procedure by a controller in an audio signal processor.

FIG. 5 is a flowchart showing a processing procedure by the controller 16B of the audio signal processor 16. When the authoring system 10 activates the controller 16B, processing proceeds from a step SP21 to a step SP22 and the controller 16B judges whether the instruction of the start of processing is input from the main controller 14 or not. If a negative result is obtained, the controller 16B repeats processing in the step SP22 and when the instruction of the start of processing is input, processing proceeds to a step SP23.

In the step, the controller 16B opens the authoring file 15 and obtains the condition of processing. Next, processing proceeds to a step SP24 and the controller 16B instructs the tape recorder 16A to reproduce a digital audio signal according to a list based upon a time code recorded in the authoring file. Further, the controller 16B instructs the encoder 16C to start the encoding of a regenerative audio signal according to a condition recorded in the authoring file 15.

Next, processing proceeds to a step SP25, the controller 16B judges whether encoding for audio frames from a time code to a time code respectively defined in the authoring file is completed or not, if a negative result is obtained, the controller repeats processing in the step SP25, while when encoding for predetermined audio frames is completed and an affirmative result is obtained, processing proceeds to a step SP26. In the step, the controller 16B records the data quantity of the elementary stream D2 for the audio frames in the authoring file 15 in units of audio frame including digital audio signals.

Next, processing proceeds to a step SP27, the controller 16B judges in the step whether encoding for one authoring processing recorded in the authoring file 15 is completed or not, if a negative result is obtained, processing is returned to the step SP25, while as an affirmative result is obtained in the step SP27 when encoding for one authoring processing is completed, processing proceeds to a step SP28, the controller notifies the main controller 14 of the completion of the processing, processing is returned to the step SP22 and the controller is ready for the next instruction.

Hereby, if the next authoring processing is registered in the authoring file 15, the controller 16B executes encoding in the next authoring processing according to the instruction of the main controller 14, hereby effectively avoids the occurrence of idle time and the audio signal processor 16 sequentially encodes a digital audio signal.

As described above, the audio signal processor 16 executes encoding according to the contents of the authoring file 15 registered by the main controller 14 by simple control only including communication between the audio signal processor and the main controller 14 for notifying the start and the completion of processing and records information required for the next multiplexing in the authoring file 15.

When an operator operates while the series of processing is executed, the controller 16B stops encoding and accepts the change of a quantization table used for encoding and others. Further, the controller 16B starts encoding according to the changed condition retroactively in a list based upon a time code by the instruction of the operator and updates the contents of the hard disk 13 by the elementary stream D2 obtained by the encoding.

As described above, the audio signal processor 16 is constituted so that the condition of encoding except a condition required to be set on the side of each device can be set by the main controller 14, the progress of processing can be monitored by the main controller 14 and therefore, the audio signal processor can be uniformly controlled by the main controller 14.

Figure 6:
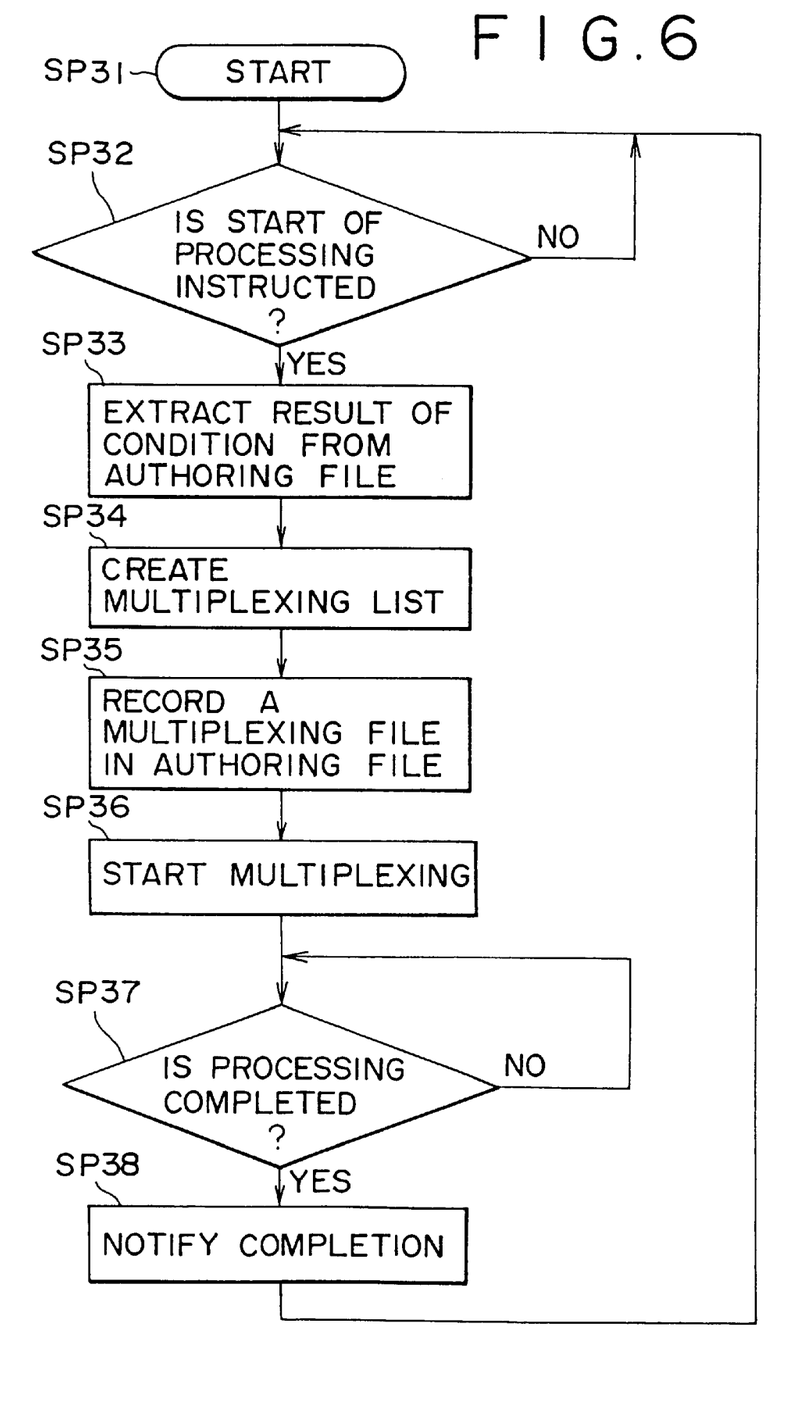
FIG. 6 is a flowchart showing a processing procedure by a multiplexer 18.

FIG. 6 is a flowchart showing a processing procedure by the multiplexer 18. When the authoring system 10 activates the multiplexer 18, processing proceeds from a step SP31 to a step SP32 and the multiplexer 18 judges whether the instruction of the start of processing is input from the main controller 14 or not. If a negative result is obtained, the multiplexer 18 repeats processing in the step SP32. In the meantime, if encoding in one authoring processing is completed in the subtitle signal processor 12, the audio signal processor 16 and the video signal processor 17 and the instruction of the start of processing is input from the main controller 14, processing proceeds to a step SP33.

In the step, the multiplexer 18 opens the authoring file 15 and obtains the condition of processing. Next, processing proceeds to a step SP34 and the multiplexer 18 starts multiplexing according to the condition recorded in the authoring file 15. That is, the multiplexer 18 sequentially divides each elementary stream D1, D2 and D3 according to the data quantity of each elementary stream D1, D2 and D3 recorded in the authoring file 15 based upon the total data quantity of each elementary stream D1, D2 and D3 which can be sequentially recorded on an optical disc. Further, the multiplexer arranges each divided elementary stream D1, D2 and D3 and generates a multiplexing list consisting of the size of each arranged part and the start address of each elementary stream in the hard disk 13. The multiplexer 18 records the multiplexing list in the authoring file in a step SP35. The multiplexer 18 sequentially reads each elementary stream D1, D2 and D3 from the hard disk 13 based upon the multiplexing list, multiplexes them and records the multiplexed stream in the hard disk 13 in a step SP36.

When the multiplexer 18 starts the multiplexing, processing proceeds to a step SP37, the multiplexer judges whether multiplexing in one authoring processing recorded in the authoring file 15 is completed or not, if a negative result is obtained, processing is returned to the step SP35, while as an affirmative result is obtained in the step SP37 when multiplexing in one authoring processing is completed, processing proceeds to a step SP38, the multiplexer records the address of the multiplexed stream in the hard disk in the authoring file 15, notifies the main controller 14 of the completion of the processing, processing is returned to the step SP32 and the multiplexer is ready for the next instruction.

Hereby, if the next authoring processing is registered in the authoring file 15 and encoding in the processing is completed, the multiplexer 18 executes multiplexing in the above authoring processing according to the instruction of the main controller 14, hereby effectively avoids the occurrence of idle time and the audio signal processor 16 sequentially multiplexes elementary streams D1, D2 and D3.

The multiplexer 18 executes multiplexing according to the contents of the authoring file 15 registered by the main controller 14 by simple control only including communication between the multiplexer and the main controller 14 for notifying the start and the completion of processing and records information required for the next processing in the authoring file 15. Hereby, the multiplexer 18 can be uniformly controlled by the main controller 14.

Figure 7:
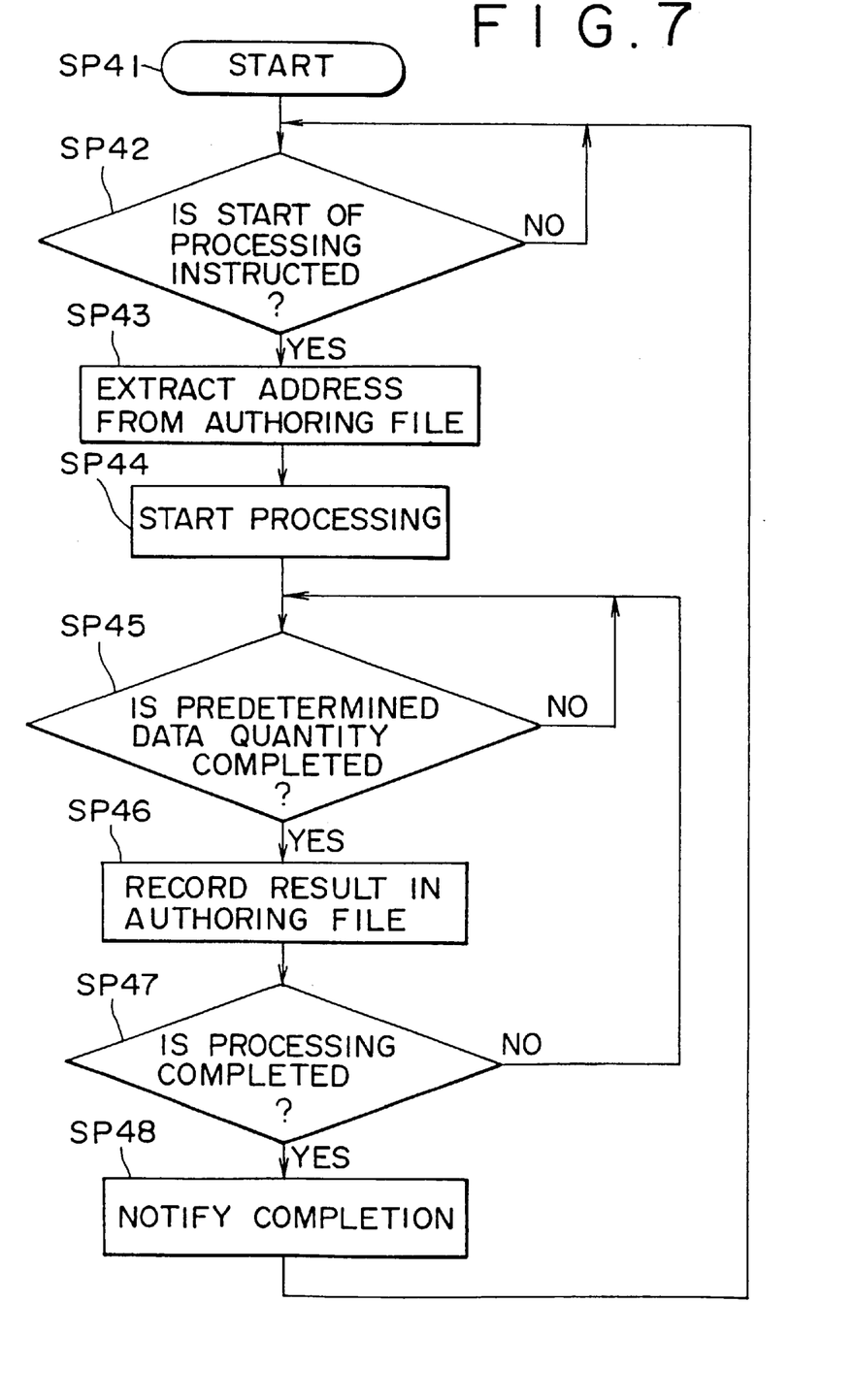
FIG. 7 is a flowchart showing a processing procedure by a streamer 19.

FIG. 7 is a flowchart showing a processing procedure by the streamer 19. When the authoring system 10 activates the streamer 19, processing proceeds from a step SP41 to a step SP42 and the streamer judges whether the instruction of the start of processing is input from the main controller 14 or not. If a negative result is obtained, the streamer 19 repeats processing in the step SP42. In the meantime, if the instruction of the start of one authoring processing is input from the main controller 14, processing proceeds to a step SP43.

In the step, the streamer 19 opens the authoring file 15 and obtains the address of multiplexed data in the hard disk.

Next, processing proceeds to a step SP44 and the streamer 19 starts processing from the address recorded in the authoring file. That is, the streamer 19 accesses to the address recorded in the authoring file 15 in the hard disk 13, sequentially reads data and records it on a recording medium such as a tape.

When the streamer 19 starts the processing, processing proceeds to a step SP45, the streamer judges whether data is read and recorded by predetermined data quantity, if a negative result is obtained, the streamer repeats processing in the step SP45, while when data is read and recorded by predetermined data quantity, the processing is completed and an affirmative result is obtained, processing proceeds to a step SP46. In the step, the streamer 19 records the result of the processing in the authoring file 15.

Next, processing proceeds to a step SP47, the streamer 19 judges whether one authoring processing recorded in the authoring file 15 is completed or not, if a negative result is obtained, processing is returned to the step SP45, while as an affirmative result is obtained in the step SP47 when one authoring processing is completed, processing proceeds to a step SP48, the streamer notifies the main controller 14 of the completion of the processing, processing is returned to the step SP42 and the streamer is ready for the next instruction.

Hereby, if the next authoring processing is registered in the authoring file 15 and multiplexing in the above processing is completed, the streamer executes the next processing according to the instruction of the main controller 14, hereby effectively avoids the occurrence of idle time and sequentially generates a multiplex stream DM.

As described above, the streamer 19 generates a multiplex stream DM according to the contents of the authoring file 15 registered by the main controller 14 by simple control only including communication between the streamer and the main controller 14 for notifying the start and the completion of processing and records the progress of the next processing in the authoring file 15. Hereby, the streamer 19 can be uniformly controlled by the main controller 14.

As described above, in the authoring system 10, beforehand, various conditions required for encoding such as the roll number of a magnetic tape on which the object of processing is recorded, a list based upon a time code showing digital video signals which are the objects of encoding and the mode of encoding, conditions required for multiplexing such as the data quantity of each elementary stream D1, D2 and D3 which can be sequentially recorded on an optical disc and conditions required for processing by the streamer 19 such as attribute information are input to the main controller 14 by an operator, and the main controller 14 generates the authoring file 15 according to these conditions (FIGS. 1 and 2).

When the start of processing is instructed by the operator after the authoring file is generated as described above, the main controller 14 instructs the subtitle signal processor 12, the audio signal processor 16 and the video signal processor 17 to start processing via communication by way of a socket.

When the subtitle signal processor 12, the audio signal processor 16 and the video signal processor 17 respectively receive the above instruction, they respectively open the authoring file 15, access to files describing the conditions of each encoding, " . . . /AUTH1/V ENC1" and the following via a file of lists "~. LIST" and hereby, the subtitle signal processor 12, the audio signal processor 16 and the video signal processor 17 respectively obtain conditions required for each encoding.

According to a list based upon a time code of the obtained conditions, in the subtitle signal processor 12, a digital video signal constituting a title is encoded, similarly in the audio signal processor 16, a digital audio signal is encoded, in the video signal processor 17, a digital video signal is encoded and elementary streams D1, D2 and D3 obtained as a result are stored in the hard disk 13.

At this time, in the subtitle signal processor 12 and the video signal processor 17, each data quantity of the elementary streams D1 and D3 is detected in units of frame and in the audio signal processor 16, the data quantity of the elementary stream D2 is detected in units of predetermined audio frame. Further, in the subtitle signal processor 12 and the video signal processor 17, the detected data quantity is recorded every predetermined GOP in the authoring file 15 as the condition of the next multiplexing or for checking the progress of processing and in the audio signal processor 16, the detected data quantity is recorded every predetermined audio frame in the authoring file 15 as the condition of the next multiplexing or for checking the progress of processing.

When in the subtitle signal processor 12, the video signal processor 17 and the audio signal processor 16, encoding in one authoring processing is completed as described above, they respectively notify the main controller 14 of the completion of the processing via communication by way of a socket.

When in the subtitle signal processor 12, the video signal processor 17 and the audio signal processor 16, encoding is completed as described above, the main controller 14 instructs the multiplexer 18 to start processing via communication by way of a socket. The multiplexer 18 accesses to the authoring file 15 according to the above instruction, obtains the condition of processing and according to the condition of processing, a multiplexing list in which each size of the elementary streams D1, D2 and D3 constituting a multiplex stream is sequentially described is generated.

At this time, in the multiplexer 18, each elementary stream D1, D2 and D3 is sequentially blocked based upon the total data quantity of each elementary stream D1, D2 and D3 which is recorded in the authoring file beforehand and can be sequentially recorded on an optical disc and the data quantity of each elementary stream D1, D2 and D3 in units of frame which is obtained by encoding, and a multiplexing list is generated.

Further, every time such multiplexing is executed by predetermined data quantity, a multiplexing list is recorded in the authoring file and hereby, the progress of multiplexing list generating processing is grasped by the main controller 14.

The elementary streams D1, D2 and D3 are sequentially read from the hard disk 13 according to the contents of the authoring file 15 and a multiplex stream is again recorded in the hard disk 13. The streamer 19 reads the multiplex stream DM from the hard disk 13 and records it on a recording medium such as a tape.

If another authoring processing is described in the authoring file 15, encoding in the above authoring processing is similarly started in the subtitle signal processor 12, the audio signal processor 16 and the video signal processor 17 in which one authoring processing is respectively completed. When the encoding is completed, multiplexing is also started in the multiplexer 18.

Hereby, in the authoring system 10, plural authoring processing is simultaneously executed to effectively avoid the occurrence of idle time in each device and the efficiency of authoring processing is enhanced.

According to the above constitution, the condition of processing which is set by each device heretofore can be set by one main controller 14 by creating an authoring file including the condition set by an operator and sharing the authoring file among each device and authoring operation can be smoothed by the quantity.

The authoring file can be also checked via the main controller 14 and the progress of processing can be also readily grasped. Further, the operation of each device can be uniformly controlled by simple control that the main controller 14 sequentially only instructs the start of processing and checks the completion of the processing.

In the above embodiment, a case that one audio signal processor, one video signal processor and one subtitle signal processor constitute the authoring system is described, however, the present invention is not limited to the case and can be also applied to a case that for any processor, plural processors are provided if necessary and others widely. Also, in the above embodiment, the encoder 12A records an encoded subtitle in the hard disk, however, the present invention is not limited to the above case and a subtitle may be also recorded in memory in the main controller 14 because the data quantity is small.

Further, in the above embodiment, a case that the modulated data row of an optical disc is generated is described, however, the present invention is not limited to the case and can be widely applied to a case that an audio signal and a video signal are recorded on/in various recording mediums and further, a case that these signals are multiplexed via various lines.

As described above, according to the present invention, a condition set by an operator is stored in a file, editing operation can be smoothly executed under simple constitution by sharing the above file among encoding means and others, compared with heretofore and also, the progress of processing in each device can be readily grasped.

What is claimed is:

1. An authoring system, comprising:
    video signal processing means for encoding a video signal;
    audio signal processing means for encoding an audio signal;
    multiplexing means for multiplexing encoded video data generated by said video signal processing means and encoded audio data generated by said audio signal processing means; and
    control means for storing a processing condition required for processing in said video signal processing means, said audio signal processing means and said multiplexing means and the result of the processing in a file shared among said video signal processing means, said audio signal processing means and said multiplexing means.

2. An authoring system according to claim 1, wherein:
    said control means respectively instructs said video signal processing means, said audio signal processing means and said multiplexing means to start processing.

3. An authoring system according to claim 1, wherein:
    said multiplexing means refers said file and multiplexes the result of processing by said video signal processing means and the result of processing by said audio signal processing means respectively recorded in said file.

4. An authoring system according to claim 1, wherein:
    the result of the processing stored in said file includes the data quantity of encoded video data generated by said video signal processing means and the data quantity of encoded audio data generated by said audio signal processing means.

5. An authoring system according to claim 1, wherein:
    a processing condition stored in said file includes the number of audio signals to be multiplexed by said multiplexer.

6. An authoring system according to claim 1, further comprising:
    a recorder for recording encoded video data generated by said video signal processing means and encoded audio data generated by said audio signal processing means, wherein:
        a processing condition stored in said file includes an address in which said encoded video data and said encoded audio video data are to be recorded in said recorder.

7. An authoring system according to claim 1, further comprising:
    a recorder for recording encoded video data generated by said video signal processing means and encoded audio data generated by said audio signal processing means, wherein:
        the result of processing stored in said file includes an address in which said encoded video data and said encoded audio data are actually recorded in said recorder.

8. An authoring method by an authoring system comprising video signal processing means for encoding a video signal, audio signal processing means for encoding an audio signal, multiplexing means for multiplexing encoded video data generated by said video signal processing means and encoded audio data generated by said audio signal processing means and control means for storing a processing condition required for processing in said video signal processing means, said audio signal processing means and said multiplexing means and the result of the processing in a file shared among said video signal processing means, said audio signal processing means and said multiplexing means, wherein:
    a video signal is encoded by said video signal processing means according to a processing starting signal sent from said control means;
    an audio signal is encoded by said audio signal processing means according to a processing starting signal sent from said control means;
    the result of said processing for encoding a video signal is stored in said file;
    the result of said processing for encoding an audio signal is stored in said file; and
    the results stored in said file of processing a video signal and an audio signal are referred and multiplexing is executed by multiplexing means based upon the processing results.

9. An authoring method according to claim 8, wherein:
    the processing result stored in said file includes the information of the quantity of encoded video data generated by said video signal processing means and the quantity of encoded audio data generated by said audio signal processing means.

10. An authoring method according to claim 8, wherein:
    a processing condition stored in said file includes the information of the number of audio signals to be multiplexed by said multiplexer.

11. An authoring method according to claim 8, further comprising:
    a step for recording encoded video data generated by said video signal processing means and encoded audio data generated by said audio signal processing means in a recorder, wherein:

in said step for multiplexing, the encoded video data and the encoded audio data respectively recorded in said recorder are sequentially read and multiplexed; and a processing condition stored in said file includes addresses in said recorder in which said encoded video data and said encoded audio data are to be recorded.

12. An authoring method according to claim 8, further comprising:

a step for recording encoded video data generated by said video signal processing means and encoded audio data generated by said audio signal processing means in a recorder, wherein:

the processing result stored in said file includes addresses in said recorder in which said encoded video data and said encoded audio data are actually recorded; and in said multiplexing step, said encoded video data and said encoded audio data are read and multiplexed based upon the addresses in said recorder in which said encoded video data and said encoded audio data respectively stored in said file are actually recorded.

* * * * *